(12) United States Patent
Huang et al.

(10) Patent No.: US 12,231,450 B2
(45) Date of Patent: Feb. 18, 2025

(54) EFFICIENT MANAGEMENT OF COMPLEX ATTACK SURFACES

(71) Applicant: Anomali Inc., Redwood City, CA (US)

(72) Inventors: Wei Huang, Redwood City, CA (US); Mohsen Imani, Redwood City, CA (US); Yizheng Zhou, Redwood City, CA (US)

(73) Assignee: Anomali Inc.

( * ) Notice: Subject to any disclaimer, the term of this patent is extended or adjusted under 35 U.S.C. 154(b) by 290 days.

(21) Appl. No.: 17/986,821

(22) Filed: Nov. 14, 2022

(65) Prior Publication Data

US 2023/0344848 A1    Oct. 26, 2023

Related U.S. Application Data

(60) Provisional application No. 63/333,792, filed on Apr. 22, 2022.

(51) Int. Cl.
*H04L 9/40* (2022.01)

(52) U.S. Cl.
CPC ...... *H04L 63/1425* (2013.01); *H04L 63/0263* (2013.01); *H04L 63/1433* (2013.01)

(58) Field of Classification Search
CPC ... H04L 9/40; H04L 63/1425; H04L 63/0263; H04L 63/1433
See application file for complete search history.

(56) References Cited

U.S. PATENT DOCUMENTS

| | | | |
|---|---|---|---|
| 9,124,621 B2 * | 9/2015 | Manadhata | H04L 63/14 |
| 10,230,742 B2 | 3/2019 | Huang et al. | |
| 10,616,263 B1 * | 4/2020 | Wells | H04L 63/1433 |
| 10,904,277 B1 | 1/2021 | Sharifi Mehr | |
| 2015/0207809 A1 | 7/2015 | Macaulay | |
| 2016/0050224 A1 * | 2/2016 | Ricafort | H04L 63/1425 726/23 |
| 2016/0173446 A1 * | 6/2016 | Nantel | H04L 63/1425 726/11 |
| 2022/0012340 A1 * | 1/2022 | Rao | H04L 63/1433 |
| 2022/0103592 A1 | 3/2022 | Semel et al. | |

FOREIGN PATENT DOCUMENTS

| | | | |
|---|---|---|---|
| CN | 112688930 A * | 4/2021 | |
| WO | WO-2014138115 A1 * | 9/2014 | G06F 16/254 |

OTHER PUBLICATIONS

International Search Report and Written Opinion, Patent Cooperation Treaty Application No. PCT/US2023/017581, Jul. 10, 2023, 12 pages.

* cited by examiner

*Primary Examiner* — Jayesh M Jhaveri
(74) *Attorney, Agent, or Firm* — Fenwick & West LLP

(57) ABSTRACT

A method for managing an attack surface is provided. The method comprises obtaining network traffic logs for the domain, correlating the logs to threats, mapping a flow of network traffic between malicious indicators and host identifiers, determining an exposed set of host identifiers, determining host attributes and indicator attributes of hosts identified in the exposed set, providing the exposed set and the attributes as input to a prioritization model, receiving prioritization scores as output from the prioritization model, and generating a prioritized attack surface data structure based on the scores. An interface is configured to modify a display based on the prioritized attack surface data structure.

20 Claims, 11 Drawing Sheets

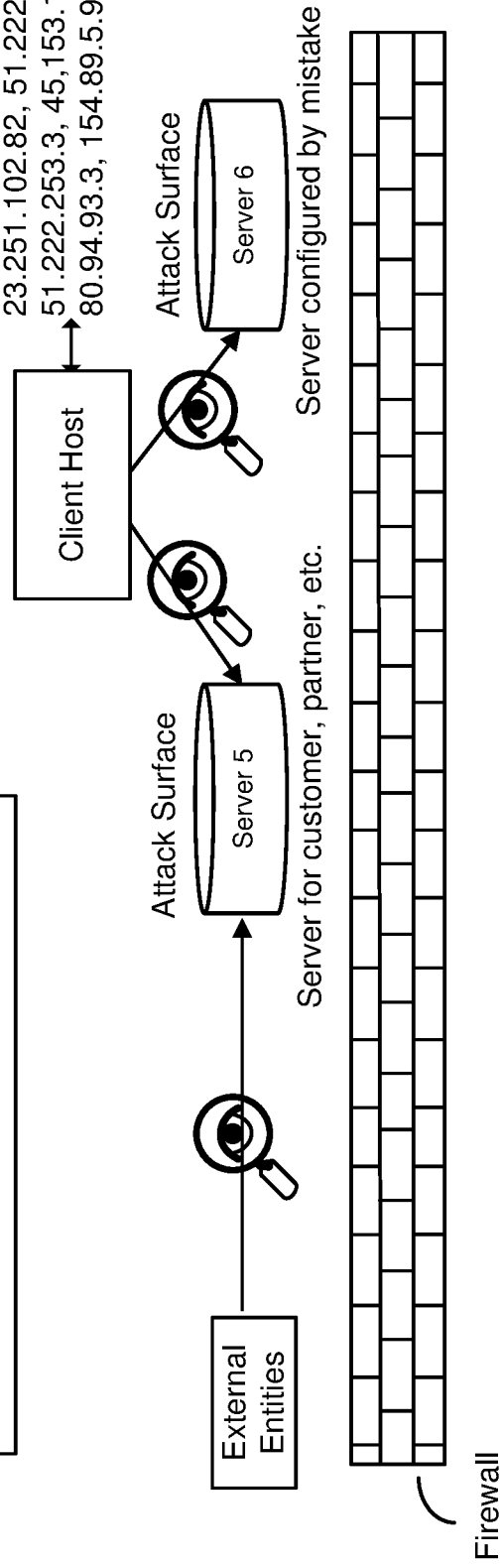
FIG. 1B - Solution

Results (19)

🔍 Search rows                                                                                    📋 Copy   Download results

| # ▾ host | ▾ incomings ▾ | inbound_ind/ malicious indicator (IOC) list |
|---|---|---|
| 1 | .119.30.131 | 76 | [185.191.171.12, 45.134.140.10, 45.129.18.123, 65.154.226.101, 41.188.17.28, 60.241.0.56, 159.89.115.177, 158.69.243.115, 115.231.154.138, 195.181.171.250] |
| 2 | .119.29.2 | 61 | [157.90.181.150, 185.191.171.10, 107.189.12.195, 174.45.213.170, 185.191.171.12, 161.156.29.33, 23.128.248.15, 167.94.138.60, 84.17.41.84, 42.200.1.98] |
| 3 | .119.29.1 | 59 | [157.90.182.25, 42.200.1.98, 95.91.15.103, 185.246.209.161, 185.191.171.40, 191.101.132.93, 62.21.231.30, 103.133.110.147, 147.135.6.46, 115.68.13.208] |
| 4 | .119.29.129 | 26 | [104.206.128.70, 154.88.26.227, 170.130.187.42, 46.101.165.77, 104.149.129.30, 103.138.109.174, 107.174.224.242, 178.239.21.230, 107.189.12.195, 205.185.114.24] |
| 5 | .119.29.37 | 3 | [104.206.128.58, 217.146.30.243, 188.172.212.111] |
| 6 | .119.29.123 | 2 | [188.172.212.111, 217.146.30.243] |
| 7 | .119.29.103 | 2 | [84.17.45.157, 89.187.185.171] |
| 8 | 10.244.74.34 | 2 | [104.149.129.58, 151.106.11.214] |
| 9 | .119.29.121 | 2 | [217.146.30.243, 188.172.212.111] |
| 10 | .119.29.35 | 1 | [64.62.197.34] |
| 11 | .119.29.8 | 1 | [64.62.197.34] |
| 12 | .119.29.53 | 1 | [64.62.197.56] |
| 13 | .119.29.4 | 1 | [23.83.185.36] |
| 14 | 10.236.255.12 | 1 | [167.248.133.150] |
| 15 | .119.29.83 | 1 | [64.62.197.42] |
| 16 | .119.29.114 | 1 | [64.62.197.34] |
| 17 | .119.29.116 | 1 | [64.62.197.49] |
| 18 | .119.29.47 | 1 | [64.62.197.60] |
| 19 | .119.29.122 | 1 | [188.172.212.111] |

< 1 >

RESULTS
_402_

| host | incoming_iocs_count | host_ports_count | explain | host_ports | incoming_iocs |
|---|---|---|---|---|---|
| 10.22.3.37 | 30 | 2 | 30 iocs have successfully reached to this host over 2 port/s. | [443,80] | [51.222.253.11, 109.70.100.26, 45.134.144.141, 178.170.37.11, 45.134.144.143, 173.231.60.196, 185.220.101.54, 136.144.42.20, 185.191.171.35, 61.133.218.202, 185.220.101.138, 45.146.165.37, 51.222.253.20, 109.70.100.83, 47.243.233.244, 61.181.30.132, 185.191.171.17, 185.191.171.21, 185.191.171.7, 185.220.101.56, 185.191.171.19, 51.222.253.16, 5.157.38.50, 185.220.101.6, 23.251.102.82, 51.222.253.19, 51.222.253.3, 45.153.160.134, 80.94.93.3, 154.89.5.94] |
| 10.41.38.114 | 16 | 2 | 16 iocs have successfully reached to this host over 2 port/s. | [443,80] | [45.134.144.141, 62.105.41.93, 95.153.32.90, 162.142.125.219, 45.146.165.37, 95.153.32.94, 45.134.144.143, 164.52.24.179, 154.89.5.94, 128.14.209.170, 114.119.142.243, 5.188.159.169, 115.29.229.14, 152.32.170.230, 36.99.136.136, 144.91.88.59] |
| 10.239.64.36 | 14 | 2 | 14 iocs have successfully reached to this host over 2 port/s. | [80,443] | [45.146.165.37, 154.89.5.94, 45.129.136.247, 185.128.41.50, 46.249.33.15, 212.47.229.134, 192.241.219.154, 132.232.10.55, 61.133.218.202, 45.134.144.143, 154.89.5.75, 144.91.88.59, 192.241.218.150] |
| 10.239.65.52 | 14 | 2 | 14 iocs have successfully reached to this host over 2 port/s. | [443,80] | [5.188.159.169, 45.146.165.37, 167.94.145.59, 167.94.145.88, 128.14.209.170, 45.134.144.141, 144.91.88.59, 45.134.144.143, 80.94.93.3, 103.203.56.1, 46.249.33.15, 42.192.69.45, 192.241.215.95, 154.89.5.94] |
| 10.41.2.252 | 13 | 2 | 13 iocs have successfully reached to this host over 2 port/s. | [443,80] | [95.153.32.90, 45.146.165.37, 62.105.41.93, 212.47.229.134, 183.136.225.42, 95.153.32.94, 109.237.103.9, 185.180.143.76, 2.56.59.20, 45.134.144.143, 45.134.144.141, 171.221.229.202, 154.89.5.94] |
| 10.110.101.221 | 12 | 2 | 12 iocs have successfully reached to this host over 2 port/s. | [8888,443] | [156.146.50.188, 212.47.229.134, 172.104.138.223, 47.243.233.244, 103.203.59.1, 134.209.24.42, 192.241.215.128, 45.134.144.141, 183.136.225.42, 45.134.144.143, 192.241.220.59, 103.203.57.10] |

FIG. 6B

EFFICIENT MANAGEMENT OF COMPLEX ATTACK SURFACES

PRIORITY

This application claims priority to U.S. provisional patent application 63/333,792 titled, "Attack Surface Reporting" to Wei Huang, et al., filed on Apr. 22, 2022, which is herein incorporated by reference in its entirety.

BACKGROUND

Monitoring an attack surface for a large organization is a difficult and time-consuming task due to the number of potential points of vulnerability. Vulnerabilities may exist for any number of reasons, such as a misconfigured firewall. Large organizations have many vulnerability points, and anticipating attacks from the several malicious actors on the internet can be costly and inefficient. Furthermore, it is difficult to draw inferences from existing reports due to lack of context.

SUMMARY

The attack surface of an organization encompasses entry points from which unauthorized access can occur to the organization's assets. The exposed entry points may include assets that are configured to be externally facing, such as a web application server or an API server that provides services to customers, or hosts that are inadvertently exposed, such as servers mistakenly configured to communicate externally due to a misconfigured firewall. As described herein, systems and methods for managing an attack surface are provided. The systems and methods involve an "inside-out" analysis of network traffic flowing into and out of the organization's domain. Using machine intelligence, the most critical vulnerabilities can be identified and addressed in an efficient manner.

In an embodiment, a method comprises obtaining network traffic logs for a domain, correlating the logs to threats, and mapping a flow of network traffic between malicious indicators and host identifiers. From the mapping, an exposed set of host identifiers is determined, along with host attributes and indicator attributes associated with the host identifiers. The exposed set and its associated attributes are provided as input to a prioritization model, and prioritization scores for each host identifier in the exposed set are received as output. From the prioritization scores, a prioritized attack surface data structure is generated and used to drive a configurable interface for sifting through information for exposed assets and other vulnerabilities, and thereby enabling management of a complex attack surface in an efficient manner.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 1B illustrates a conceptualization of an attack surface management solution.

FIG. 6A illustrates an exemplary exposed asset report provided in an interface, according to an embodiment.

FIG. 6B illustrates another exemplary exposed asset report provided in an interface, according to an embodiment.

DETAILED DESCRIPTION

Figure 1A:
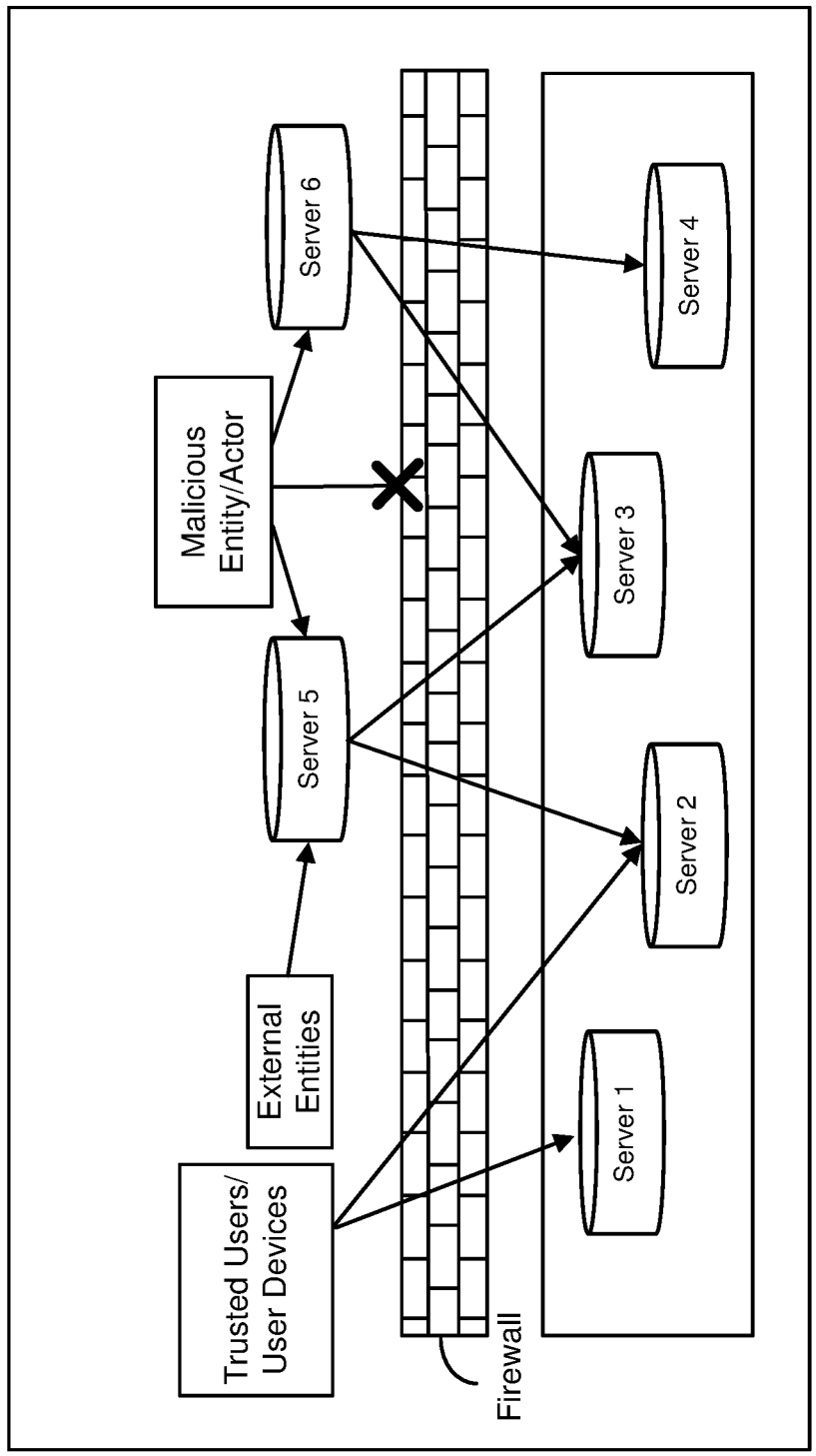
FIG. 1A illustrates a conceptualization of an attack surface management problem.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

As used herein, an "attack surface" may refer to a set of possible entry points for unauthorized access to an organization or system. The entry points may include both digital entry points (e.g., applications, code, ports, servers, websites, etc.) and physical entry points (e.g., endpoint devices, desktop computers, laptops, mobile devices, hard drives, Universal Serial Bus (USB) drives, etc.). As such, the attack surface may comprise identifiers for each entry point, such as host identifiers (hosts IDs), port identifiers, device identifiers, combinations thereof, and the like. Furthermore, in embodiments, an attack surface of a domain may be identified by an exposed set of host identifiers, which may comprise a data structure mapping relations between host identifiers associated with vulnerable hosts/entry points and malicious indicators associated with malicious entities that have contacted the hosts or accessed the entry points. For example, the relations may include host identifier-malicious indicator pairs, in addition to a total number of malicious indicators that have successfully reached, contacted, or accessed each of the host identifiers from the host-identifier-malicious indicator pairs. In embodiments, the exposed set of host identifiers may be scored using a machine learning model to rank each host identifier and form a prioritized attack surface data structure.

As used herein an "asset," may refer to a physical or virtual device that can send and receive data. For example, an asset may be a client or a server that sends and receives applications, services, other data, or some combination thereof. A "network host," "host," or "host asset" may refer to an asset that communicates with other assets through a particular network or domain (i.e., communicates with other hosts of the domain). A "host identifier" may refer to an identifier for a host, such as a unique identifier that uniquely identifies the host. In embodiments, network traffic between hosts and malicious indicators are mapped to identify exposed hosts that form an attack surface of a domain. As used herein, a "malicious indicator" or "indicator of compromise" (IOC) may refer to an entity identifier for a potential threat, such as an IP address, domain, name, or uniform resource locator (URL) of a malicious entity attempting to infiltrate an organization's network or client domain through one or more entry points on an attack surface of the network or domain. In embodiment, hosts and malicious indicators may be represented by nodes in a graph. A "node" may refer to a unique identifier describing an element of information in a graph. For example, in a directed graph that maps relationships amongst elements of information found in network traffic logs, the nodes may represent the host identifiers of hosts communicating in the network (i.e., host nodes) and malicious indicators for malicious entities communicating with the hosts (i.e., indicator nodes).

"Attack surface management" refers to activities directed at identifying, resolving, and/or reducing entry points on an attack surface, including discovery, monitoring, prioritization, reporting, evaluation, and remediation of exposed assets. For example, the attack surface of an organization may encompass entry points from which unauthorized access can occur to the organization's assets, and managing the attack surface may involve directing resources at finding and resolving vulnerabilities and other issues at assets exposed at the entry points. These assets can be externally facing, such as a web application server or an API server, or inadvertently exposed due to a misconfigured firewall such as a network storage device, and so on.

FIG. 1A illustrates a conceptualization of an attack surface management problem, according to an embodiment. Server 1, server 2, server 3, and server 4 may be assets of a client domain and may be configured inside of a firewall, which an employee/trusted user of the client domain may access. Server 5 may be a server configured outside of a firewall to allow access by external entities that are not trusted users of the client domain, such as customers and partners that access services provided through the client domain but do not have trusted permissions to directly access assets behind the firewall (e.g., hosts external to the client domain). The server 5 may be configured to communicate with server 2 and server 3 through the firewall. Server 6 may be a misconfigured server that is supposed to communicate with server 3 and server 4 from inside of the firewall but is mistakenly configured outside of the firewall. A malicious entity cannot communicate directly through the firewall but may infiltrate the client domain by communicating with server 5 and server 6.

With more and more organizations moving functions to cloud-based services and remote workforce on the rise, the attack surface is no longer limited to the confines of on-premises devices. Therefore, analyzing an attack surface and managing such assets is not a trivial task. An organization may rely on third-party scanning services to assess their attack surface. Such services scan for vulnerable assets from the "outside in," and are severely limited in their capabilities due to the following reasons: (1) legal restrictions of information that can be scanned on the internet, which limits the ability to identify all exposed assets; (2) lack of deeper insight in reports due to limited context and limited understanding of an asset; and (3) restricted insight when an asset is behind an application or a network load balancer. A hybrid approach can also be used to scan from the "outside in" by scanning the entire internet and also working with the organization to review their outward facing assets for configuration flaws, firewall rules, and so on. However, although such an approach provides more coverage, it can still miss critical gaps in an organization's infrastructure.

FIG. 1B illustrates a conceptualization of an attack surface management solution, according to an embodiment. The attack surface management (ASM) tool may monitor network traffic, including network traffic flowing to server 5 and server 6 to perform asset discovery and asset prioritization for hosts receiving incoming traffic from malicious indicators (e.g., IOCs), which may be controlled by a malicious actor/entity.

The systems and methods described herein provide a unique solution to identify an attack surface from the "inside out". That is, network logs of hosts of a domain are scanned, rather than scanning the entire internet. From the network logs of the hosts, machine intelligence can be used to prioritize hosts for remediation, such as by using a machine learning model trained on features relating to service exposure, network connectivities, admin defined asset criticalities, and connecting indicators found in past examples of attack surfaces. Without requiring expensive scan services or a hybrid approach, the systems and methods can correlate an organization's network telemetry with malicious threat indicators at a high rate (e.g., 190 trillion correlated events per second) to discover assets that are exposed to the internet and have been scanned by adversaries from the outside.

Furthermore, the systems and methods described herein augment the identified assets with asset vulnerability information from a prioritization model to prioritize hosts that need urgent patches or other remediation. For example, if a host is communicating with a known indicator of compromise, it may likely be a vulnerable host that an organization should take care of. As one example, additional context about a host indicates that the host is a server that belongs to an organization's finance department, which may likely be a high-risk, high-value asset. The system may also pin-point that the server is not patched for Log 4J, thereby raising the criticality of the host even further. And, if the server is communicating with a known Log 4J indicator of compromise and is not patched for Log 4J, it may be likely that the host is already compromised and should be taken down immediately to control further damage.

By utilizing attack surface management systems and methods described herein, complete coverage for all hosts of a domain or network can be provided quickly and efficiently, thereby reducing its attack surface.

Attack Surface Management (ASM)

The ASM solution described herein may comprise two main parts: (1) Asset discovery; and (2) Asset prioritization. In asset discovery, internet-facing assets of an organization can be determined without active scanning and without using an inventory list. To discover the internet facing assets, the network logs are correlated to threat intelligence (e.g., threat data feeds). Correlating the network logs with threat intelligence enables the discovery of malicious actors/entities in the network traffic and also helps in determining the hosts/assets in the organization. Using this technique, hosts of a domain can be identified without any inventory list. After determining the hosts in the network traffic logs, a directed graph is generated in which its nodes represent a particular host or malicious indicator, and directed edges are the instances and direction of traffic between hosts or between hosts and malicious indicators as reflected in the network traffic logs. From the directed graph, a system identifies hosts with incoming edges from malicious indicators. These hosts are identified as the exposed (e.g., internet facing) hosts. Furthermore, the system determines which ports of the hosts may be exposed (e.g., to the internet) on these assets. After discovering all the internet facing hosts, the system prioritizes them. Asset prioritization is performed by applying the data for the exposed host (i.e., the host identifiers and associated host attributes and indicator attributes) to a prioritization model, which may be a machine learning model, rules-based algorithm, or some combination thereof.

Figure 2:
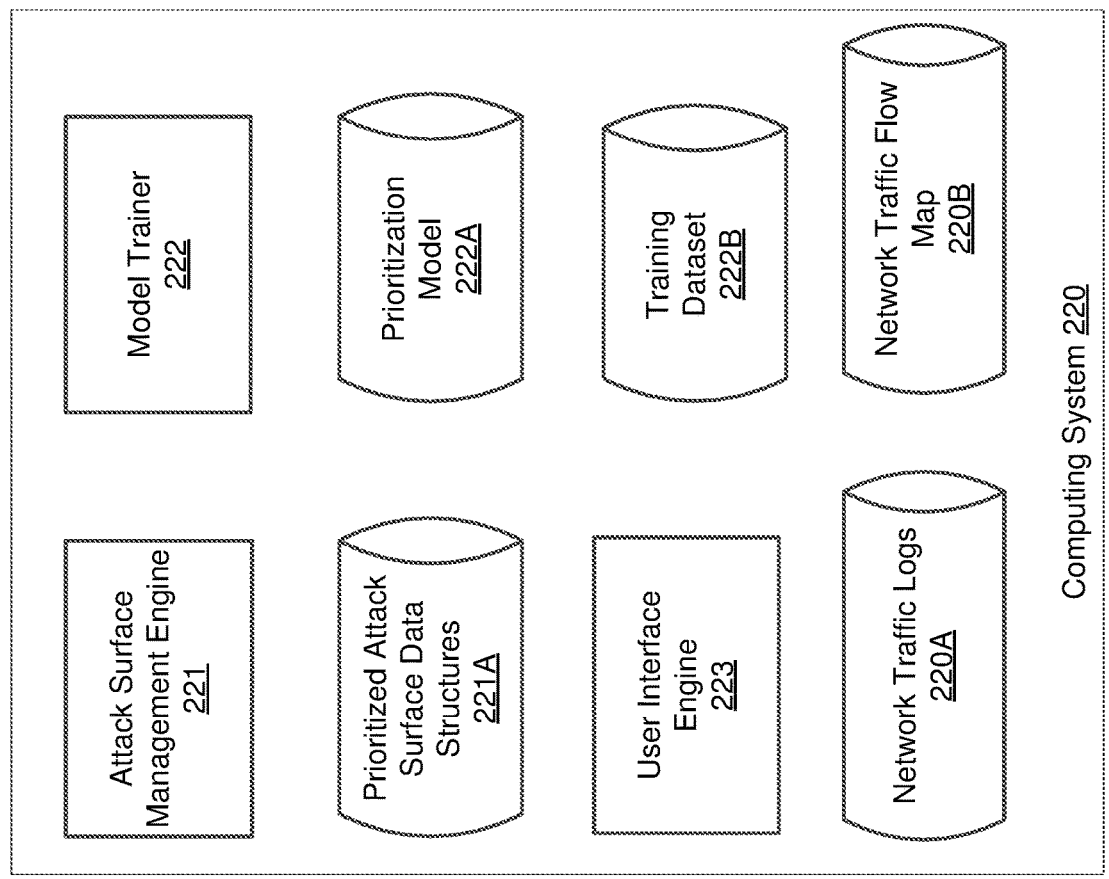
FIG. 2 illustrates a computing environment configured for attack surface management, according to an embodiment.
Figure 2:
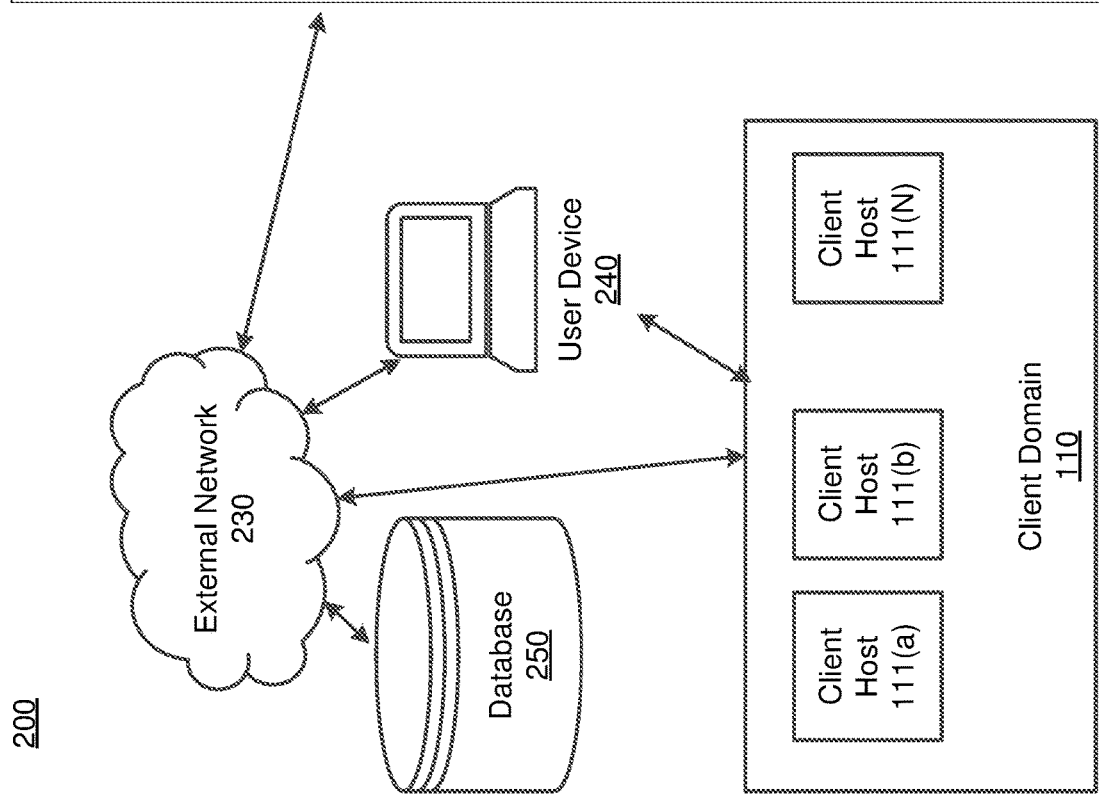

FIG. 2 illustrates a computing environment configured for attack surface management. As depicted in FIG. 2, computing environment 200 includes client domain 110, computing system 220, external network 230, user device 240, and database 250. A user of the user device 240 may use the user device 240 to communicate with the computing system 220 over external network 230 for managing an attack surface relating to client domain 110. In various embodiments, the computing environment 200 may include different, fewer, or additional components. Also, while each of the components in the computing environment 200 is described in a singular form, the computing environment 200 may include one or more of each of the components.

Client domain 110 is a grouping of multiple private computer networks or hosts operating within a shared infrastructure. For example, the client domain 110 may comprise a group of assets, including workstations, devices, computers, databases, and servers that share different types of data via network resources. The client domain may include any number (N) of internal-facing and external-facing client hosts, including a first client host 111(a), a second client host 111(b), and so on, through an Nth number of client hosts 111(N). Each client host 111 is a particular host within the client domain 110 that is configured to communicate with the other hosts of the client domain 110 (i.e., the other N−1 client hosts 111) and may also be configured to communicate outside of the client domain 110 according to predefined rules established for the client hosts 111. The external-facing assets may be assets exposed to external network 230. The external network 230 may be a network that exists outside of a firewall configured for the client domain 110. External network 230 facilitates an exchange of data messages between client domain 110, computing system 220, user device 240, and database 250. In embodiments, the external network 230 may be a public network, such as the internet.

Figure 8:
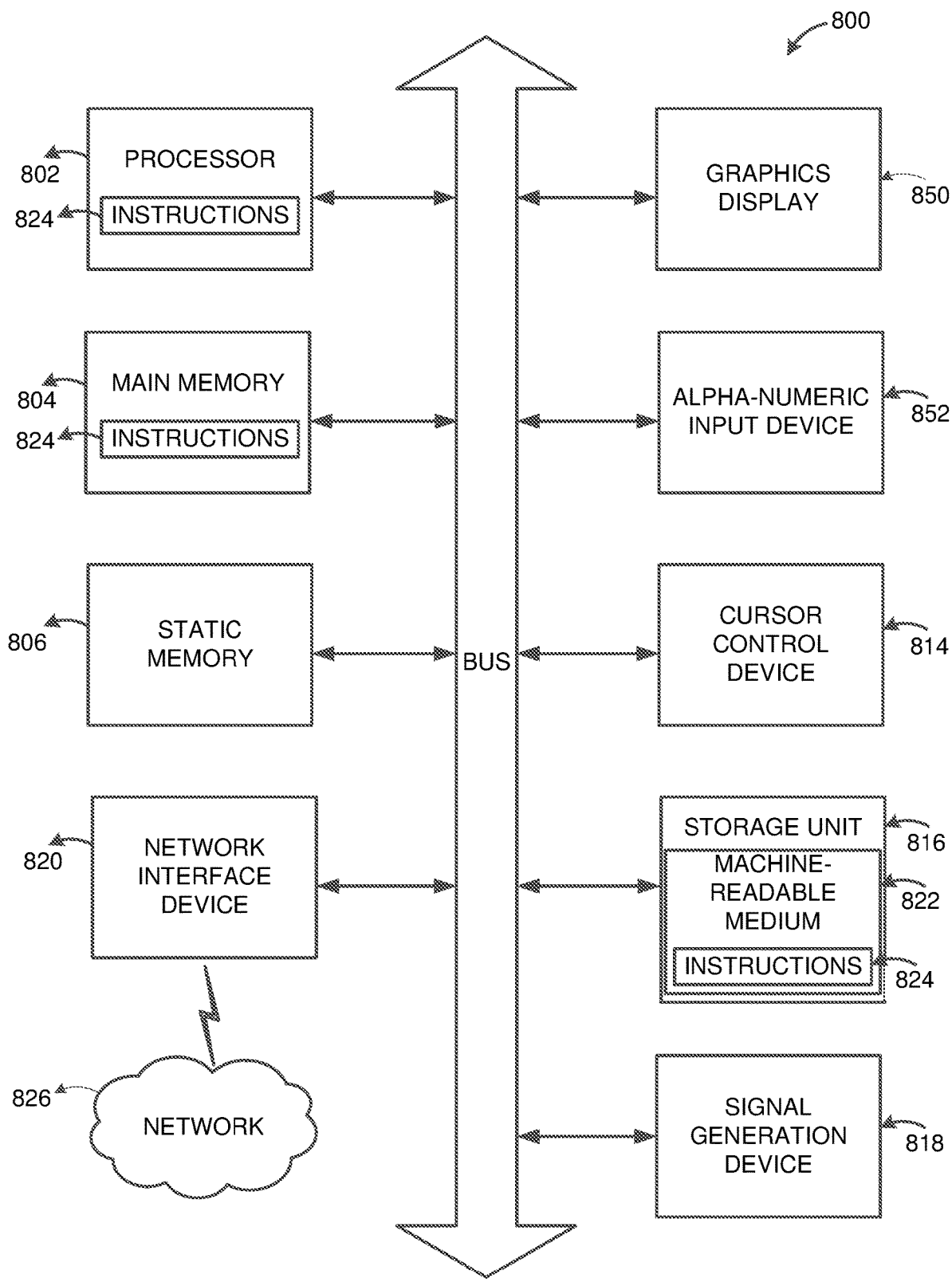
FIG. 8 is a block diagram illustrating components of an example machine configured to read instructions from a machine-readable medium and execute the instructions in a processor (or controller).

Computing system 220 performs computational tasks, including tasks for discovering, prioritizing, and managing assets that form an attack surface of client domain 110. The computational tasks may be performed by a processor of computing system 220 that executes instructions in the form of computer-readable code stored on a computer-readable medium, such as a memory device. An example computing system 220 is computer system 800 of FIG. 8, described greater detail with respect to the description of FIG. 8 provided further below. Computing system 220 comprises network traffic logs 220A, a network traffic flow map 220B, an attack surface management engine 221, prioritized attack surface data structures 221A, a model trainer 222, a prioritization model 222A, a training dataset 222B, and a user interface engine 223.

Attack surface management engine 221 generates prioritized attack surface data structures 221A. As used herein, a "prioritized attack surface data structure" may refer to a set of organized data that relates hosts identified as forming an attack surface of a domain to their priority relative to other hosts that form the attack surface. For example, the prioritized attack surface data structures 221A may include sequences of data, filterable lists, relational tables, other structured datasets ranking hosts in order of priority, or some combination thereof. The attack surface management engine 221 may monitor or obtain network traffic logs 220A of a client domain 110 and generate a prioritized attack surface data surface for the client domain 110. For example, the attack surface management engine 221 may be configured to monitor network traffic to and from hosts belonging to the client domain 110 and transmit alerts to a user or owner of the client domain 110, such as by providing reports, dashboarding, and suggestions of mitigative action that are provided through a configurable interface to the user device 240 that accepts inputs from the user device 240 and modifies a display of the user device 240.

Prioritized attack surface data structures 221A comprise data for hosts that form an attack surface of domain 110 and their priority, including host identifiers of hosts that form the attack surface and their associated host attributes, indicator attributes, and priority score/ranking. The prioritized attack surface data structures 221A can be displayed in the form of a report, dashboard, or other alert. For example, computing system 220 may submit an email to a user of user device 240 over external network 230. As another example, user interface engine 223 may provide a user interface to user device 240 that enable the user of user device 240 to navigate, search, and filter information in an interface that modifies a display of the user device 240 based on the prioritization attack surface data structures 221A and on inputs provided to the user device 240 by the user. As such, an interface for efficient attack surface management is provided, generating useful structured and prioritized information that is derived from network traffic logs 220A, which allows the user to discover and resolve issues and reduce the attack surface of client domain 110 in a more automated fashion.

Model trainer 222 trains a prioritization model 222A using a training dataset 222B. The model trainer is configured to build the prioritization model 122A by applying a learning algorithm to a training dataset 122B. By training an initial prioritization model 222A, a trained prioritization model 222A is generated and can be used or deployed by computing system 220 to generate prioritization scores for prioritizing hosts that form an attack surface of client domain 110. For example, attack surface management engine 221 may provide an exposed set of host identifiers as input to the trained prioritization model 222A and receive the prioritization scores for each host identifier in the exposed set of host identifiers as output.

Model trainer 222 is configured to obtain the training dataset 222B. In one embodiment, model trainer 222 retrieves the training dataset 222B from database 250. The training dataset 222B comprises examples that the prioritization model 122A can learn from, including data for host identifiers, host attributes associated with each host identifier, indicator attributes associated with each host identifier, and target prioritization scores associated with each of the host identifiers. As used herein, a "host attribute" associated with a host identifier may refer to characteristics about a host itself, such as characteristics of its ports, the type, quantity, and level of importance of services that run on the ports, the network connectivity of a host in relation to other hosts of the same domain (e.g., level of network entanglement, how many lateral hops can be made from the host, etc.), an admin-defined criticality of the host, vulnerabilities of the host, other characteristic of the host or underlying asset identified by the host identifier, or some combination thereof. As used herein, an "indicator attribute" associated with a host identifier may refer to characteristic about malicious indicators that have reached/communicated with a host, such as the number of malicious indicators that have reached the host or its underlying asset, the level of confidence (i.e., confidence score) that a particular malicious indicator has reached the host, the types of each of the malicious indicators that have reached the host, other characteristics about malicious indicators that are in some way correlated or in contact with the host, or some combination thereof.

Model trainer 222 is configured to generate feature vectors for each host identifier in the training dataset 222B based on its associated host attributes and indicator attributes. For example, different sets of host attributes, indicator attributes, or some combination thereof, can be grouped into "features." A "feature" may refer to a collection of data that may be predictive of a certain outcome (e.g., low score, medium score, high score, etc.). A "feature vector" may refer to a data array or vector containing numerical values for each type of data in the collection of data that make up a corresponding feature. A feature vector may include values that can be derived from host attributes and indicator attributes. As one example, a particular feature vector may be a "connecting indicator feature vector" that contains values for the number of malicious indicators in communication with a host, values for identifiers for the malicious indicators, values indicating a type of malicious indicator, and values for other indicator attributes associated with a host identifier. In some embodiments, the grouping of host attributes and indicator attributes into features may be predetermined or preselected. For example, the model trainer 222 may obtain the features prior to training, such as by accessing from a local memory of the computing system 220 or database coupled to/accessible by the computing system 220 (e.g., database 250) defining and providing instructions for groupings of host attributes and indicator attributes into feature vectors. In other embodiments, the grouping of host attributes and indicator attributes into features may be performed using a feature extraction method, such as clustering or other unsupervised learning method, and the model trainer 222 may be configured to perform the feature extraction method on the training dataset 222B to obtain the feature vectors.

In embodiments, the feature vectors may include exposed services feature vectors, network connectivity feature vectors, asset criticality feature vectors, endpoint vulnerability feature vectors, connecting indicator feature vectors, or combinations thereof. "Exposed services feature vectors" may refer to feature vectors relating to the services associated with a host. In one embodiment, computing system 220 may generate exposed service feature vectors by identifying ports associated with a host identifier and determining services running on the ports. For example, a host may comprise two ports, which may be used to send and receive data for a web service, and the exposed services feature vector may comprise values that uniquely identify the particular web service or particular type of web service. Based on the web services that are associated with the host, the computing system 220 generates the exposed services feature vector using corresponding values for the web services and associates with the host identifier.

"Network connectivity feature vectors" may refer to feature vectors relating to a host's level of network connectivity within a domain. In one embodiment, the network connectivity feature vectors may be generated by evaluating network connections associated with a host identifier and generating network connectivity feature vector based on the evaluation. For example, using network traffic flow map 220B, computing system 220 may calculate the number of network connections of a host and may determine a value quantifying the level of network traffic flowing in and out of a host to generate values for the network connectivity feature vector. In embodiments, the network traffic flow map 220B may be a directed graph of nodes connected by directed edges, including host nodes for each host identifier from network traffic logs 220A and indicator nodes for each malicious indicator from network traffic logs 220A. Each directed edge between a host node and an indicator node in the directed graph maps a direction of flow of network traffic between a host identifier and a malicious indicator.

"Asset criticality feature vectors" may refer to feature vectors relating to a level of criticality associated with a host. In one embodiment, the asset criticality feature vectors are generated by obtaining a list of critical host identifiers, comparing the host identifiers to the list of critical host identifiers, and generating the asset criticality feature vector based on the comparison. For example, computing system 220 may retrieve the list of critical host identifiers from an admin of client domain 110 (e.g., from a user of user device 240) over the external network 230 by receiving the list of critical host identifiers from the user device 240 or retrieving from a database where the list may be stored (e.g., in database 250), and may compare the list to the host identifiers for a match. If a match exists, a corresponding value in the asset criticality feature vector indicating the match may be generated (e.g., 1 for match, 0 for no match). In one embodiment, the asset criticality feature vector may further comprise a value indicating a degree of criticality. For example, information from the list of critical host identifiers may be extracted and used to predict a level of criticality that may be expressed as a value on a predefined scale (e.g., 0 to 100, very low to very high, etc.).

"Endpoint vulnerability feature vectors" may refer to feature vectors relating to vulnerabilities associated with a host. In one embodiment, the endpoint vulnerability feature vectors are generated by identifying vulnerabilities associated with a host identifier, determining if any of the vulnerabilities are a critical vulnerability, and generating the endpoint vulnerability feature vector based on the determination. For example, computing system 220 may correlate host attributes to markers of vulnerability indicating different types of vulnerabilities with different levels of criticality. If the level of criticality for a marker is above certain predefined thresholds, then a value in the endpoint vulnerability feature may be generated (e.g., five different thresholds being associated with five different values, ranging from 1—very low criticality, 2—low criticality, 3—medium criticality, 4—high criticality, 5—very high criticality).

"Connecting indicator feature vectors" may refer to feature vectors relating to malicious indicators associated with a host, such as features and attributes of malicious indicators that have connected with, contacted, or in some other way in communication with or associated with the host. In one embodiment, the connecting indicator feature vectors are generated by determining a number of malicious indicators connected to the host identifier, confidence scores for each of the malicious indicators connected to the host identifier, and types for each of the malicious indicators. Values for each of these determined attributes may be generated as values in the connecting indicator feature vector. For example, in a connecting indicator feature vector for a host, the first value in the connecting indicator feature vector may be the number of malicious indicators connected to a host, a second set of values may be the unique identifiers for each of the malicious indicators, a third value or third set of values may be the confidence score for each malicious indicator (e.g., confidence level that the corresponding entity is malicious, or confidence level that the malicious indicator has actually contacted the host) or average confidence score for the malicious indicators, and a fourth set of values may be values indicating the type for each malicious indicator.

Trainer 222 is configured to apply the feature vectors to a machine learning model during training, such as to a regression model, to predict prioritization scores for each of the host identifiers. The regression model may serve as an initial model for building the prioritization model 222A. The regression model is configured to associate regression coefficients to each of the feature vectors. When a feature vector is applied to the regression model, the values of the feature vectors are multiplied by the regression coefficients to produce an output value. From the output value, a prioritization score can be derived, either by directly selecting the output value as the prioritization score, or by performing one or more additional operations to the output value (e.g., normalizing the output value, generating a distribution using a set of output values, performing some other mathematical/statistical operation or probabilistic formulation, or some combination thereof). Trainer 222 is configured to compare predicted prioritization scores to target prioritization scores and update the regression coefficients associated with the feature vectors based on the comparison. In embodiments, the updated regression coefficients form the weighting of the feature vectors in the prioritization model 222A. Additional details regarding the training of prioritization model 222A performed by model trainer 222 are provided with respect to the description of FIG. 5, further below.

Prioritization model 222A generates prioritization scores for host identifiers of hosts that form an attack surface of client domain 110. By providing host identifiers and associated host attributes and indicator attributes as input to the prioritization model 222A, computing system 220 obtains prioritization scores as output from the prioritization model 222A. In embodiments, the host attributes and indicator attributes for a host are used to derive feature vectors for those host, which are then applied to the prioritization model 222A to obtain the prioritization scores for the host. For example, each feature vector is associated with a weight, and thus, has a corresponding effect on the prioritization score predicted by the prioritization model 222A.

User interface engine 223 provides an interface configured to modify a display of user device 240 based on the prioritized attack surface data structures 221A. The user interface engine 223 may provide graphics containing visuals and text that can be displayed through an application or browser. For example, a report can be generated in the interface of an email application or in a web browser. The contents of the report are extracted from the prioritized attack surface data structures 221A. For example, the report may provide information relating to hosts associated with the highest prioritization scores relative to other hosts that form the attack surface of client domain 110. In one embodiment, the interface provided by user interface engine 223 responds to user inputs provided to the user device 240. For example, the interface may provide filters, search fields, and other selectable inputs, which may alter and modify the contents of the interface, and therefore modifying the display of user device 240 on which the interface is rendered, such as by reducing, increasing, or altering the information relating to data extracted from the prioritized attack surface data structures 221A. In one embodiment, inputs provided to the user device 240 responsive to elements of the interface provided by user interface engine 223 may initiate a mitigative action relating to the host identifiers of the prioritized attack surface data structures 221A. For example, the interface may provide information regarding mitigative actions (e.g., taking an asset offline, rerouting a host, shutting off a web service provided at a port, etc.) for resolving issues with highly prioritized host identifiers in an exposed set of host identifiers of the client domain 110 (i.e., points on the attack surface), and the user interface engine 223 may be configured to receive user inputs from user device 240 and send a signal to initiate or perform the corresponding mitigative actions.

User device 240 provides a user with computational resources for interacting in the computing environment 200. The user and user device 240 may be associated with user data and preferences. In one embodiment, the user data and preferences may be stored in database 250. In embodiments, database 250 may further store attributes of hosts, assets, and other entities. The attributes may include host attributes corresponding to host identifiers and indicator attributes corresponding to malicious indicators. The attributes may be used to determine values in a feature vector for a host identifier in an exposed set of host identifiers that can be used to generate a prioritization score for the host identifier when applied to prioritization model 222A, such as any of the feature vectors previously mentioned (e.g., exposed services feature vectors, network connectivity feature vectors, assets criticality feature vectors, endpoint vulnerability feature vectors, connecting indicator feature vectors, etc.). In one embodiment, database 250 may store historical data for client domain 110, including data/interactions between the client domain 110 and computing system 220 and/or interactions between user device 240 operated by an admin of client domain 110 for managing an attack surface of the client domain 110. In one embodiment, a user of user device 240 may use the user device 240 to upload the data of database 250 as mentioned above for storage into database 250 and for access by the user device 240, computing system 220, client domain 110, by other components of computing environment 200, or some combination thereof.

Figure 3:
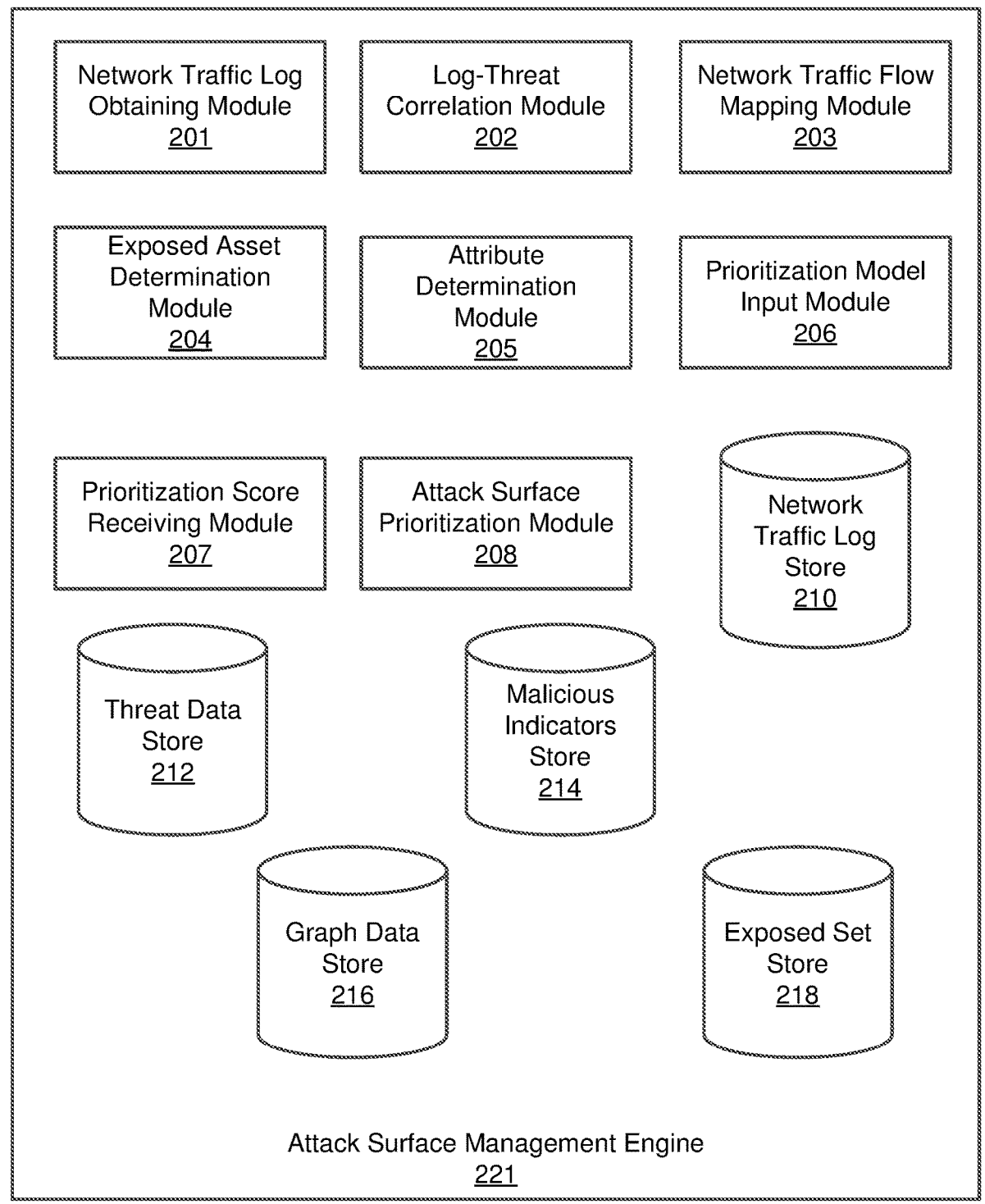
FIG. 3 illustrates a detailed diagram of the attack surface management engine in FIG. 2, according to an embodiment.

FIG. 3 illustrates a detailed diagram of the attack surface management engine 221 in FIG. 2. Attack surface management engine 221 may comprise modules of computer-executable instructions, or code, for performing functional tasks when executed by a processor. As shown, the attack surface manager 120 includes a network traffic log obtaining module 201, a log-threat correlation module 202, a network traffic flow mapping module 203, an exposed asset determination module 204, an attribute determination module 205, a prioritization model input module 206, a prioritization score receiving module 207, and an attack surface prioritization module 208. The attack surface management engine 221 may also comprise one or more data stores, including network traffic log store 210, threat data store 212, malicious indicators store 214, graph data store 216, and exposed set store 218. In various embodiments, the attack surface management engine 221 may include different, fewer, or additional modules.

Network traffic log store 210 stores network traffic logs for a client domain 110. The network traffic logs may comprise timestamps indicating times when each message in a network traffic log was transmitted and received, as well as timestamps for when each network traffic log was obtained by the computing system 220. Furthermore, the network traffic logs may comprise identifiers for the entity (e.g., host) that sent or received the message, and an identifier for the entity where the network traffic log was obtained from. For example, the identifiers may include unique identifiers for each client domain 110, user device 240, and/or user of a user device 240, such as a user profile identifier (ID) stored in database 250 that is correlated to the user device 240 or client domain 110 (e.g., a User ID for an admin of client domain 110).

Threat data store 212 stores data for identifying threats. The data may include "threat data feeds." A used herein, a "threat data feed" may refer to a set of data corresponding to threats, including lists of malicious indicators and data associated with the malicious indicators, such as indicator attributes, including time of threats, types of threats, confidence of the threats being valid (i.e., confidence score), severity of the threats, destination and source ports, tags, geography, other attributes relating to an identification of a malicious indicator, its degree, and/or nature, or some combination thereof. In one embodiment, the threat data feeds in threat data store 212 may contain indicator attributes that are not associated with a particular malicious indicator. For example, the threat data feeds may include markers of suspicious activity, such as anomalous communication behavior (e.g., sending and receiving messages at abnormal times, at abnormal time intervals or frequencies, or according to an irregular schedule) or other anomalous network events. More information regarding identifying threats from threat data or threat data feeds are provided in issued U.S. Pat. No. 10,230,742 titled, "Space and Time Efficient Threat Detection" to Huang et al., which is herein incorporated by reference in its entirety.

Malicious indicators store 214 stores data for malicious indicators identified from a correlation of network traffic logs of network traffic log store 210 to threat data feeds of threat data store 212. The data may include the malicious indicators that are identified as communicating with hosts of client domain 110 and the indicator attributes of the identified malicious indicators. Malicious indicators store 214 may further comprise relations between the malicious indicators store 214 that are discovered by log-threat correlation module 202. As such, the malicious indicators store may store associations between host identifiers of client domain 110 and indicator attributes of malicious indicators connected to the host identifiers.

Network traffic log obtaining module 201 obtains network traffic logs. A user of user device 240 may provide network traffic logs of client domain 110 via external network 230. Network traffic log obtaining module 201 receives the network traffic logs and stores them in network traffic log store 210. In one embodiment, network traffic log obtaining module 201 may obtain the network traffic logs by monitoring the network traffic of client domain 110 in real-time or near real-time. For example, a user of user device 240 may be an admin of the client domain 110 and may give the computing system 220 access or permission to monitor network traffic coming in and out of the client domain 110.

Log-threat correlation module 202 correlates network traffic logs of network traffic log store 210 with threat data store 212 to identify malicious indicators of malicious indicators store 214 and host identifiers for hosts of client domain 110 that communicate with the identified malicious indicators. For example, log-threat correlation module 202 scans a list of malicious indicators in threat data store 212 and compares each entry to each network log in the network traffic log store 210 that is associated with the client domain 110. If there is a match between a malicious indicator from threat data store 212 and an identifier found in a network traffic log for client domain 110 (e.g., matching IP address, domain name, or other unique identifier or network address), then the identifier found in the network traffic log is determined to be a malicious indicator. Log-threat correlation module 202 may then identify the host identifiers communicating with the identified malicious indicators in the network traffic logs 220A as being identifiers for hosts of the client domain 110. As such, hosts/assets of the client domain 110 may be identified by log-threat correlation module 202 directly from the network traffic logs 220A of client domain 110 and without an inventory list of assets explicitly defining/identifying the hosts of the client domain 110. In one embodiment, log-threat correlation module 202 may compare indicator attributes, such as markers of suspicious behavior, from threat data store 212 to activity from the network traffic logs 220A to identify the malicious indicators and hosts of the client domain 110. For example, if a particular IP address, domain name, or other network address is attempting to communicate with several hosts/identifiers from the network traffic logs 220A over a short period of time or is engaging in other anomalous network behavior, as reflected in the network traffic logs 220A, then the particular network address may be identified as a malicious indicator for the client domain 110.

Network traffic flow mapping module 203 maps a flow of network traffic between the host identifiers for the hosts of client domain 110 and the malicious indicators of malicious indicators store 214. By mapping the flow of network traffic, a network traffic flow map 220B is generated, which may take the form of a directed graph. The network traffic flow map 220B may be stored in graph data store 216. Network traffic flow mapping module 203 generates the directed graph by generating host nodes for each host identifier for the identified hosts from the network traffic logs 220A identified by log-threat correlation module 202 and by generating indicator nodes for each malicious indicator from the network traffic logs 220A identified by log-threat correlation module 202. Network traffic flow mapping module 203 generates directed edges in the directed graph between the host nodes and the indicator nodes, mapping a direction of flow of network traffic between a host identifier corresponding to the host node and a malicious indicator corresponding to the indicator node, as reflected in the network traffic logs 220A. For example, a network traffic log showing a message (e.g., a request for data or a transmission of data) sent from a malicious indicator to a host identifier will be mapped in the directed graph as a directed edge flowing from the malicious indicator to the host identifier.

Exposed asset determination module 204 determines from the network traffic flow map 220B an exposed set of host identifiers for client domain 110 amongst the hosts identified by log-threat correlation module 202 (e.g., as a subset of the host identifiers identified from the network traffic logs 220A) having inbound traffic from a malicious indicator of malicious indicators store 214. The exposed set of host identifiers identify a set of hosts that form an attack surface of client domain 110. Exposed asset determination module 204 may store the exposed set of host identifiers in exposed set store 218. In one embodiment, exposed set determination module 204 determines the exposed set of host identifiers for client domain 110 using the direct graph generated by network traffic flow mapping module 203. To determine the hosts having inbound traffic from a malicious indicator, exposed asset determination module 204 may determine directed edges in the directed graph generated for the client domain 110 having a direction moving from an indicator node to a host node and identify the host identifiers that correspond to the host node as a host identifier of the exposed set of host identifiers for the client domain 110.

Attribute determination module 205 may determine host attributes and indicator attributes associated with each host identifier in the exposed set of host identifiers. To determine the host attributes, attribute determination module 205 may retrieve data for each host identifier in the exposed set. For example, attribute determination module 205 may retrieve attributes associated with each host identifier in the exposed set from database 250, such as services associated with ports of the host identifier, a criticality level associated with the host identifier (e.g., as designated by an admin of the client domain 110), vulnerabilities associated with the host identifier, level of criticality associated with the vulnerabilities, other host attributes for generating values of a feature vector for the host identifier, or some combination thereof. Furthermore, attribute determination module 205 may determine host attributes for a host identifier by evaluating a graph in graph data store 216. For example, attribute determination module 205 may use a directed graph for client domain 110 generated by network traffic flow mapping module 203 to determine network connections of the host identifier, such as the number, type, and distance (e.g., number of network hops), between the host identifier and other host identifiers, malicious indicators, or some combination thereof. To determine the indicator attributes, attribute determination module 205 may retrieve data from threat data store 212, database 250, malicious indicators store 214, graph data store 216, or some combination thereof. For example, attribute determination module 205 may use threat data feeds to determine types for each malicious indicator identified from network traffic logs 220A and determine confidence scores for each malicious indicator using an assessment of threat data feeds and the directed graph generated by network traffic flow mapping module 203.

Prioritization model input module 206 provides exposed set of host identifiers from exposed set store 218, and host attributes and indicator attributes associated therewith, as input to prioritization model 222A. Prioritization model input module 206 groups the host attributes and indicator attributes into feature vectors for each host identifier in the exposed set and applies the feature vectors to the prioritization model 222A. The prioritization model 222A is configured to generate prioritization scores for each of the host identifiers based on a weighting of its associated feature vectors. For example, prioritization model 222A may apply the feature vectors to a regression function that applies learned regression coefficients to each feature vector and sums each of the products to generate an output value that can be used as the prioritization score or that can be used to derive the prioritization score after additional functions are applied to the output value.

Prioritization score receiving module 207 receives as output from prioritization model 222A prioritization scores associated with each host identifier in the exposed set of host identifiers provided as input to the prioritization model 222A. For example, the prioritization score receiving module 207 may store each prioritization score in a memory of computing system 220, such as in a cache, other auxiliary memory, or in long term storage. The prioritization scores for each host identifier can be used to rank each host identifier in the exposed set (i.e., prioritize the attack surface of client domain 110).

Attack surface prioritization module 208 generates prioritized attack surface data structures 221A based on prioritization scores received by prioritization score receiving module 207. For example, attack surface prioritization module 208 may determine a rank for each host identifier in the exposed set by comparing the prioritization score for each host identifier and ordering them in sequence from highest score to lowest score. The sequence may be used as the prioritized attack surface data structures 221A along with the host attributes and indicator attributes associated with each host identifier in the sequence. An interface is configured to modify a display based on the prioritized attack surface data structures 221A. For example, the interface may be provided by user interface engine 223 to user device 240. A user of the user device 240 may be an administrator of client domain 110, and information in the display can be used to identify and resolve issues pertaining to an attack surface of the client domain 110, such as by providing inputs to the user device 240.

Figure 4:
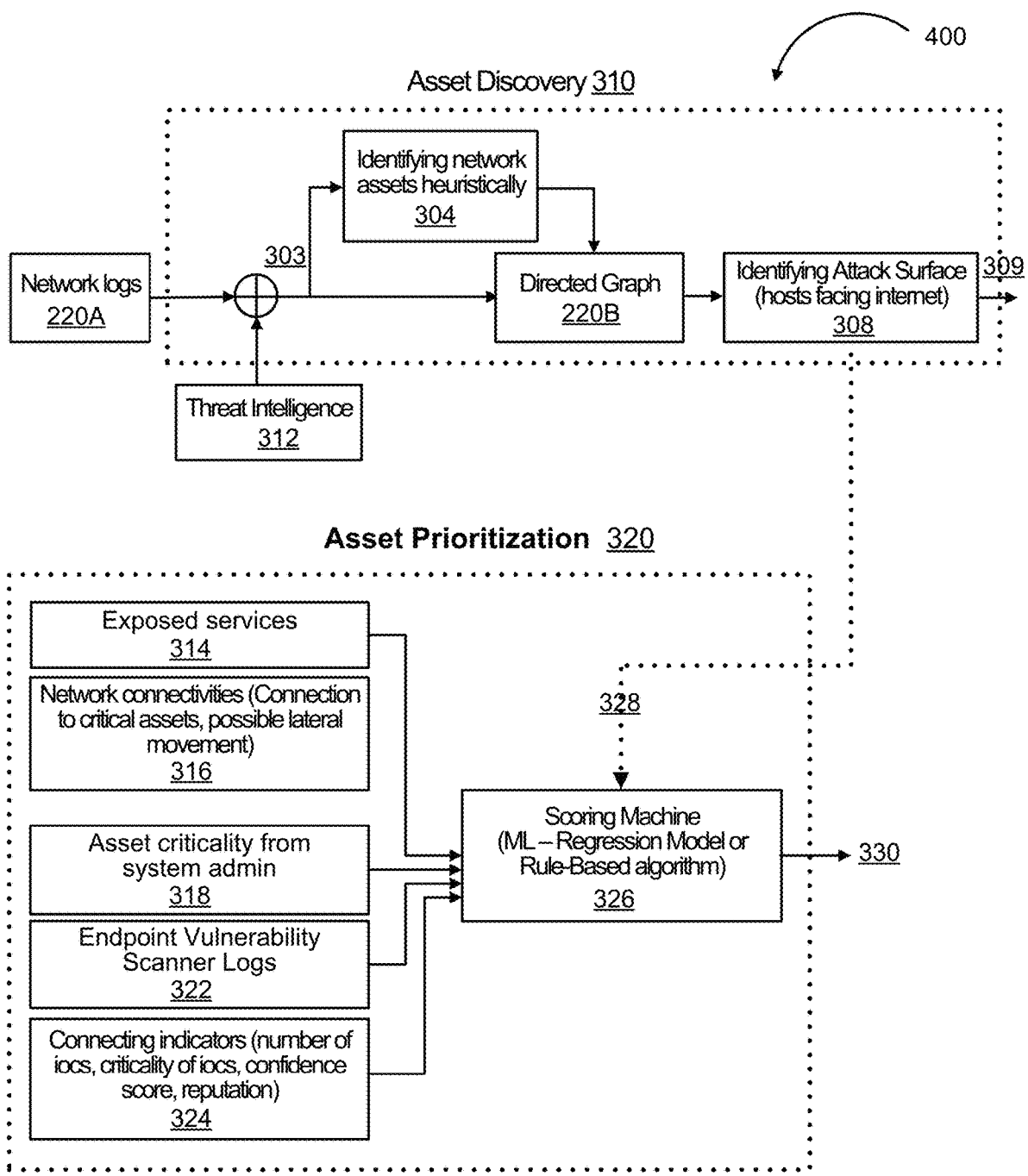
FIG. 4 illustrates a block diagram of an attack surface management process, according to an embodiment.

FIG. 4 illustrates a block diagram of an attack surface management process, according to an embodiment. The asset surface management process 400 is performed by computing system 220. The asset surface management process 400 comprises asset discovery 310 and asset prioritization 320. In asset discovery 310, network traffic logs 220A of a client domain 110 and threat intelligence/threat data feeds 312 of threat data store 212 are obtained and correlated 303 to identify 304 network assets/hosts of the client domain 110. In one embodiment, identifying 304 the hosts of the client domain 110 may further involve using heuristic methods.

A directed graph, which may be network traffic flow map 220B, is generated from the network traffic logs 220A by mapping the flow of network traffic data between each host in the network traffic logs 220A. Each node in the directed graph may represent a host identifier from the network traffic logs 220A (host node) or a malicious indicator (indicator node), and each directed edge between two host identifier nodes represents network traffic logged between the corresponding hosts and the direction of the logged traffic between the hosts. An exposed set of host identifiers (i.e., an attack surface of client domain 110) is then identified 308 using the directed graph 220B, by scanning the directed graph 220B for directed edges having a direction moving from an indicator node to a host node and identifying the host identifier that corresponds to the host node as a host identifier to compile into the exposed set (i.e., identifies a host that forms the attack surface of the client domain 110). In one embodiment, the exposed set of host identifiers is provided as output 309 by the computing system 220. For example, a user may request a complete, unfiltered, and unranked report of the attack surface of client domain, which may include the exposed set of host identifiers. In embodiments, the exposed set of host identifiers may be prioritized/scored 328 to identify prioritized assets in asset prioritization 320 and output one or more prioritization scores 330 for each host identifier in the exposed set, and for generating a prioritized attack surface data structure.

In asset prioritization 320, attributes of the attack surface and of the client domain and/or network are evaluated to prioritize one or more assets. To generate prioritization scores for each asset/host making up points of the attack surface, the points on the attack surface may be applied to scoring machine 326, which may comprise prioritization model 222A, including a machine learning model (e.g., a regression model), rule-based algorithm, or some combination thereof.

Exposed services feature vector 314 may comprise input features derived from asset discovery 310. A list of open ports is obtained which indicates a list of services running on the assets. The number of services running on an asset and their importance may be included as a predictive feature by prioritization model 222A. Network connectivity feature vector 316 may comprise input features extracted from the directed graph 220B which define how entangled each asset is to the client domain 110 or to the organization's network, including the degree to which it entangled, whether the asset is connected to critical assets, and how easily an attacker can move laterally in the network of client domain 110 if the attacker gets access to the asset. Asset criticality feature vector 318 may comprise input features derived from information provided by system administrators that identify how critical each asset is. Endpoint vulnerability feature vector 322 may comprise input features identifying whether there is a vulnerability in an asset. If there is a critical vulnerability in the asset, the asset may be weighted as high risk and prioritized. Connecting indicators feature vector 324 may comprise input features derived from the number of malicious indicators reaching an asset, confidence scores for each connection to an indicator, and the types of connections between the asset/host and the malicious indicator. In one embodiment, third-party reputation enrichments or "indicator enrichments" may also be incorporated as an input feature. Indicator enrichments may include additional context, such as the type of services hosted by an indicator and any malicious activities that have occurred in the past.

One or more of the feature vectors 314, 316, 318, 322, 324 and the exposed set of host identifiers are applied to the scoring machine 326 comprising prioritization model 222A to generate prioritization scores 330 for each point on the attack surface. For example, the scoring machine 326 may comprise a machine learning model that is trained to predict prioritization scores from examples of hosts having attributes corresponding to the feature vectors 314, 316, 318, 322, and 324. The trained prioritization model 222A may be deployed in asset prioritization 320 by applying each host and its attributes to the prioritization model 222A to obtain a prioritization score for each of the points/hosts of the attack surface (i.e., for each host identifier in the exposed set). The prioritized scores 330 are used by the computing system 220 to generate a prioritized attack surface data structure 221A that is used to drive a configurable interface. For example, an alert may be sent that provides in an interface at a display a prioritized/ranked report or filtered list identifying hosts and host attributes of the attack surface or a configurable dashboard for displaying highly prioritized assets/hosts of the attack surface and for managing the attack surface, such as by viewing suggestions of mitigative actions for each asset. Additionally details regarding examples of configurable interfaces are provided with respect to the descriptions of FIGS. 6A, 6B, and 7 further below.

Figure 5:
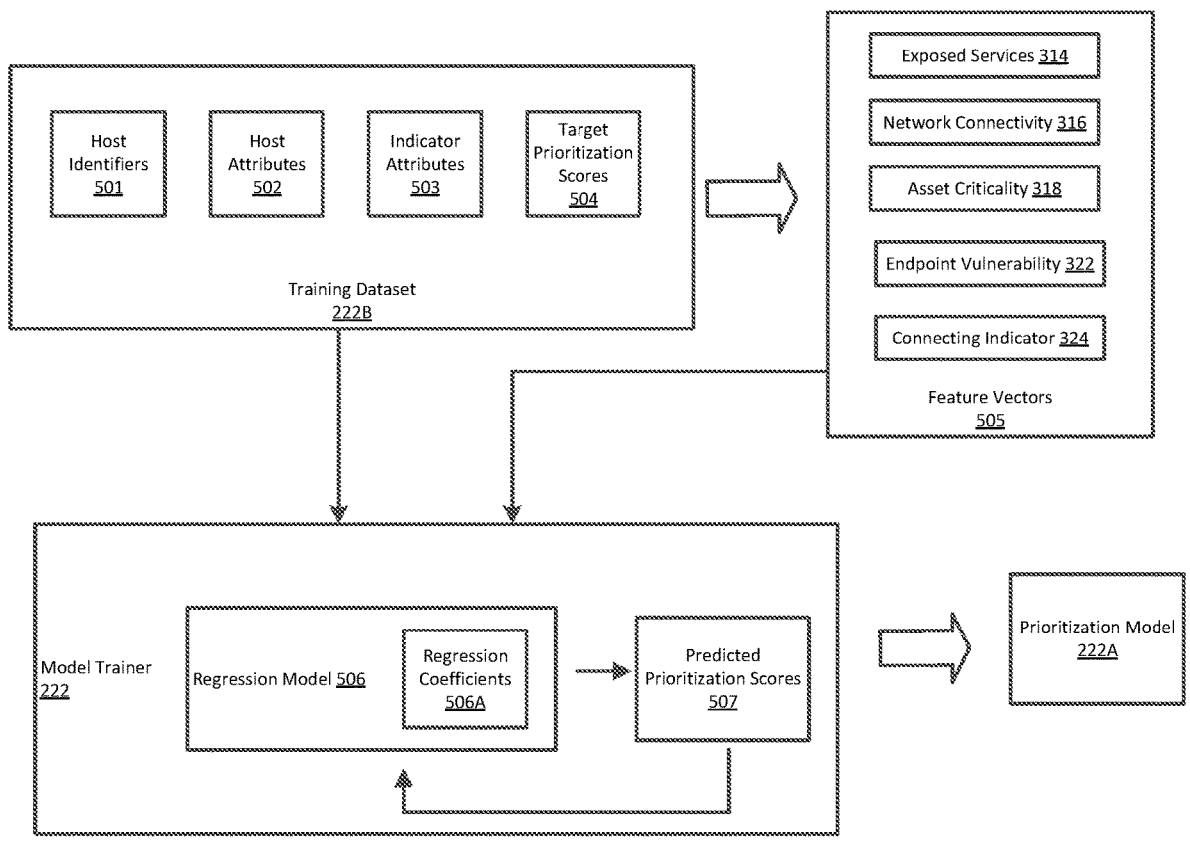
FIG. 5 illustrates a diagram of training of a prioritization model, according to an embodiment.

FIG. 5 illustrates a diagram of training of a prioritization model, according to an embodiment. Training process 500 is performed by computing system 220 to generate a prioritization model 222A configured to receive host identifiers, host attributes associated with each of the received host identifiers, and indicator attributes associated with each of the received host identifiers as input. The trained prioritization model 222A is configured to output a prioritization score for each of the received host identifiers. Model trainer 222 trains prioritization model 222A by obtaining a training dataset 222B. The training dataset 222B may include a set of host identifiers 501, a set of host attributes 502 associated with each host identifier 501, indicator attributes 503 associated with each host identifier 501 in the training dataset 222B, and target prioritization scores 504 associated with each of the host identifiers 501.

From the training dataset 222B, computing system 220 generates feature vectors 505 for each host identifier 501 in the training dataset 222B based on the host attributes 502 and indicator attributes 503. For example, for each host identifier 501 in the training dataset 222B, computing system 220 may generate an exposed services feature vector 314, a network connectivity feature vector 316, an asset criticality feature vector 318, an endpoint vulnerability feature vector 322, and a connecting indicator feature vector 324 by evaluating its corresponding host attributes 502 and indicator attributes 503 relevant to each feature vector in the feature vectors 505.

Model trainer 222 applies the feature vectors 505 to a regression model 506 to predict prioritization scores 507 for each of the host identifiers. The regression model 506 associates the regression coefficients 506A to the feature vectors 505. Model trainer 222 compares the predicted prioritization scores 507 to the target prioritization scores 504 and updates the regression coefficients 506A associated with the feature vectors 505 based on the comparison. For example, model trainer 222 may be configured to adjust the regression coefficients 506A in cycles to reduce an error, loss, or cost between the target prioritization scores 504 and the predicted prioritization scores 507.

The updated regression coefficients 506A form a weighting of each feature vector in the prioritization model 222A. When the trained prioritization model 222A is deployed by the computing system 220, attack surface management engine 221 applies new host identifiers from an exposed set determined from network traffic logs 220A, and their corresponding host attributes and indicator attributes to predict prioritization scores for each host identifier in the exposed set. For example, using instructions of prioritization model input module 206, computing system 220 generates the feature vectors 505 for each host identifier in the exposed set and applies the regression coefficients 506A as a weighting for each feature vector 505 (e.g., by applying corresponding regression coefficients 506A learned during training to each of exposed services feature vector 314, network connectivity feature vector 316, asset criticality feature vector 318, endpoint vulnerability feature vector 322, and connecting indicator feature vector that computing system 220 generates for each host identifier). Based on the weighting, prioritization model 222A predicts a prioritization score for each host identifier in the exposed set, and the attack surface management engine 221 uses the prioritization scores to generate prioritized attack surface data structure 221A. User interface engine 223 provides a user interface that modifies a display based on the prioritized attack surface data structure 221A.

FIG. 6A illustrates an exemplary exposed asset report provided in an interface, according to an embodiment. The interface may be a user interface generated and provided by user interface engine 223 to user device 240. The report 401 displays contents generated from the prioritized attack surface data structures 221A. The report 401 may be requested from a user device 240 to retrieve information on hosts of client domain 110 that are exposed to an external network 130 (e.g., the internet), such as those relating to host identifiers of the exposed set of host identifiers discovered from the network traffic logs 220A (e.g., according to instructions of exposed asset determination module 204). In embodiments, the report 401 may filter firewall logs or VPC logs to show only inbound traffic that was allowed through the firewall. The prioritized assets may be enumerated and identified by host identifier of each asset. Incoming traffic flowing from malicious indicators to each prioritized asset is enumerated, including the number of incoming indicators and the host identifiers of each malicious indicator to the asset. In embodiments, the report 401 may indicate, for example:

(1) host—Enterprise assets that are destinations of inbound traffic that matches malicious indicators;
(2) incomings—Unique malicious indicator match count per host; and
(3) inbound_ind—The list of the malicious indicators that are communicating with the hosts.

In other embodiments, other parameters and information derived from the prioritized attack surface data structure, as described previously above, may be indicated in the report 401.

The report 401, which may utilize the network traffic logs 220A, shows allowed inbound traffic to both public IP addresses (0.119.XXX.XXX) and private IP addresses (10.244.74.35 and 10.256.255.12), for example. The entries to the XXX.119.XXX.XXX subnet show traffic to network interfaces that expect inbound traffic. For example, an external IP address is configured to listen for traffic. The first row shows 76 unique malicious indicators that were allowed connection to the host XXX.119.30.131. A user of user device 240 can next look at the security vulnerabilities in a dashboard (e.g., dashboard 403 shown in FIG. 7) that the host might be exposed to and patch them immediately. Additionally, a user of the user device 240 (e.g., an analyst) can identify who the host belongs to (e.g., through the asset data that is present in dashboard 403) and whether it should be even exposed to the external network 230. Lastly, the user of the user device 240 can determine if the host is already compromised by analyzing the malicious indicators displayed through the interface that are already successfully allowed to connect to the host. If the host has unpatched vulnerabilities which are associated with the malicious indicator, the user of the user device 240 may take an immediate action to isolate the host, e.g., by providing inputs to the user device 240.

FIG. 6B illustrates another exemplary exposed asset report provided in an interface, according to an embodiment. The interface may be a user interface generated and provided by user interface engine 223 to user device 240. The report 402 displays contents generated from the prioritized attack surface data structure 221A. The report 402 may be requested from a user of the user device 240 to retrieve information on hosts of client domain 110 that are exposed to an external network 130 (e.g., the internet). The results of the report 402 may comprise the host identifier of each prioritized asset of the attack surface/exposed set of the client domain 110, the count of incoming malicious indicators (incoming_iocs count), the count for ports of the hosts (host_ports_count), an explanation of traffic flowing from the malicious indicators (explain), identifiers for the host ports (host_ports), and unique identifiers of malicious indicators (incoming_iocs).

Figure 7:
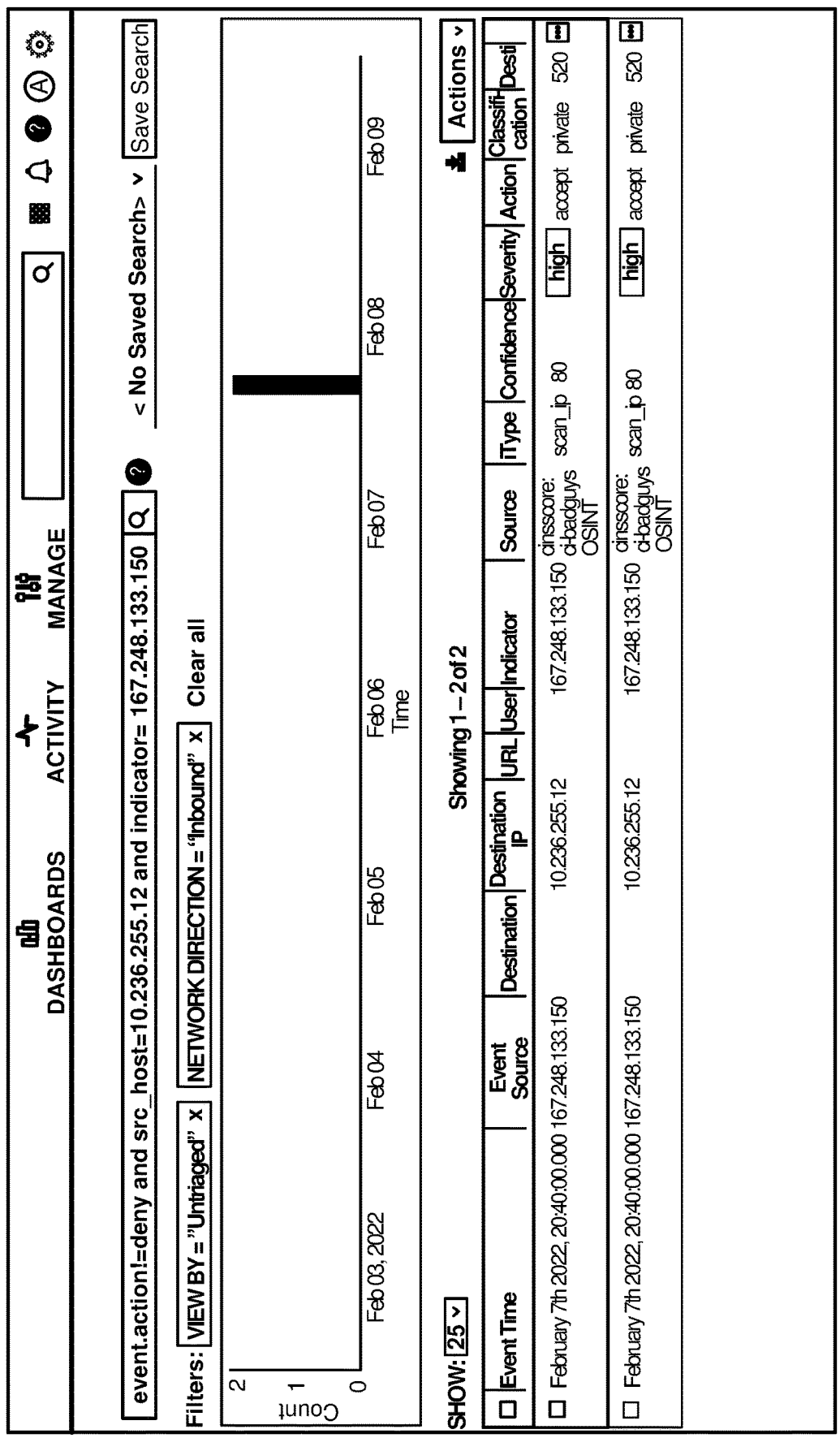
FIG. 7 illustrates an exemplary attack surface management dashboard provided in an interface, according to an embodiment.

FIG. 7 illustrates an exemplary dashboard provided in an interface, according to an embodiment. The interface may be a user interface provided by user interface engine 223 to user device 240. The dashboard may provide contents generated from prioritized attack surface data structure 221A. Entries of a report (e.g., report 401 or report 402), such as entries with private IP addresses, may be investigated using dashboard 403. Inbound traffic may not be expected to private IP addresses, which if detected, may indicate that a firewall is misconfigured and allowing traffic from a known indicator of compromise. A user of user device 240 (e.g., an analyst) can gain further insight into this host using dashboard 403, as shown in the following example. The event data about hosts 10.244.74.35 and 10.256.255.12 is automatically correlated with threat intelligence and asset enrichment. The dashboard 403 may be searched for the correlated records to provide asset details (e.g., hostname, criticality, platform, vulnerabilities, etc.) as well as details about the malicious indicators that were used to identify the prioritized asset (e.g., in this case, indicator 167.248.133.150 is known to perform unlawful IP and port scans). A user/manager of the client domain 110 or the organization's network security team can then use the dashboard 403 to quickly correct this misconfiguration and reduce the attack surface through user device 240. In other embodiments, additional visualizations and analysis tools may be added within the dashboard 403 to allow the user of user device 240 to generate a report on their own. As such, a user interface engine 223 may provide an interface that modifies a display of the user device 240 based on the prioritized attack surface data structure and enables efficient management of a complex attack surface.

Example Computer System

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804 and the storage unit 816 communicate via a bus 808.

In addition, the computer system 800 can include a static memory 806, a display driver 850 (e.g., to drive a plasma display panel (PDP), a liquid crystal display (LCD), or a projector). The computer system 800 may also include alphanumeric input device 852 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Method for Managing an Attack Surface

Figure 9:
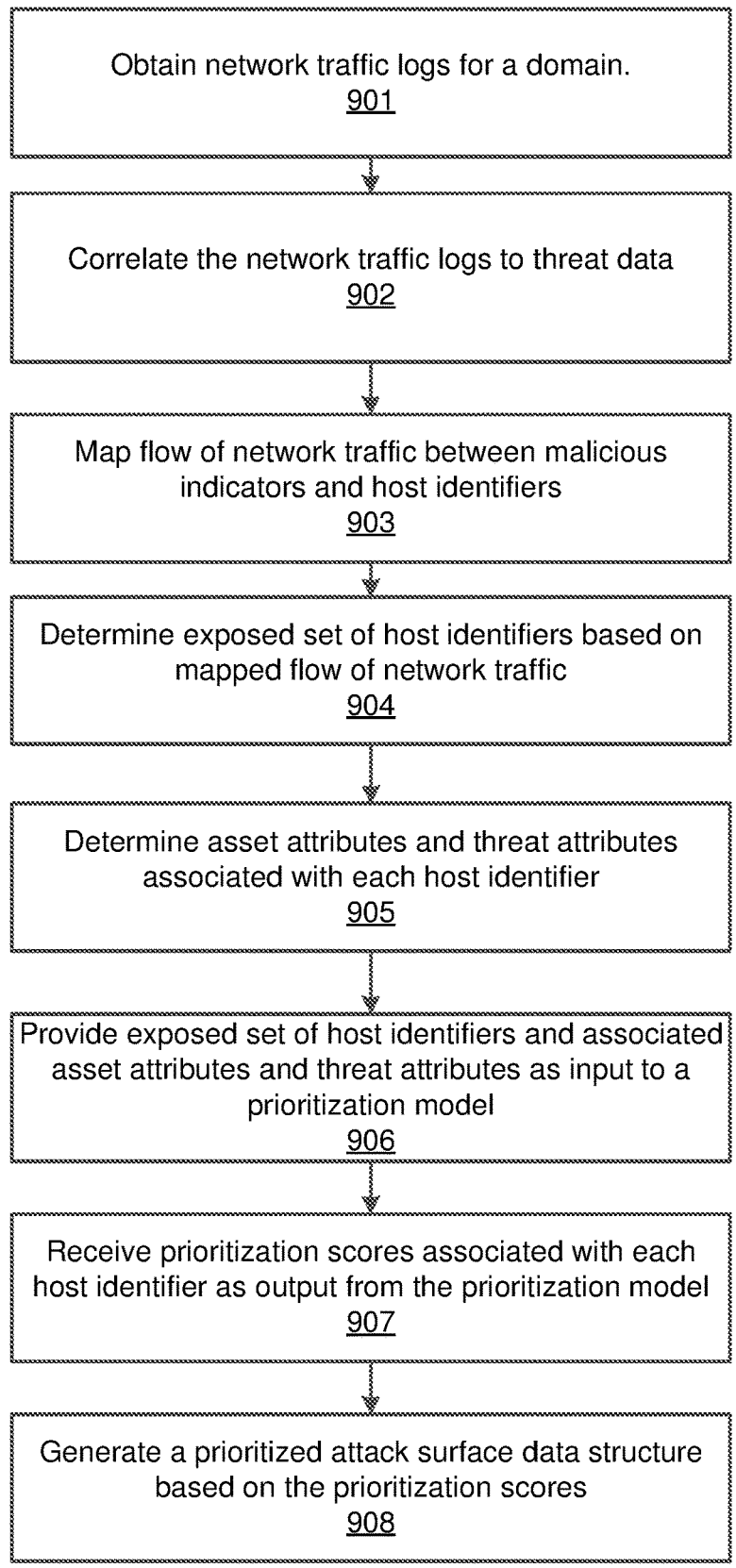
FIG. 9 illustrates a flow diagram of a method for managing an attack surface, according to an embodiment.

FIG. 9 illustrates a flow diagram of a method for managing an attack surface, according to an embodiment. The method may be implemented as instructions stored on a non-transitory computer-readable medium (e.g., instructions 824) executed by a processor 802, which may be a processor of the computing system 220. The computing system 220 executes the instructions to perform the method for managing an attack surface, in accordance with the descriptions above.

The processor obtains 901 network traffic logs for a client domain 110. In one embodiment a user of user device 240 may provide (e.g., upload) the network traffic logs 220A for the client domain 110 to the computing system 220, or to a database 250 accessible by the computing system 220, via external network 230. In another embodiment, computing system 220 may actively monitor the network traffic of client domain 110 to obtain the network traffic logs 220A.

The processor correlates 902 the network traffic logs to threat data. The processor correlates the network traffic logs 220A with threat data feeds from threat data store 212 to identify malicious indicators and to identify host identifiers communicating with the malicious indicators in the network traffic logs 220A. The identified host identifiers identify the hosts of the client domain 110.

The processor maps 903 a flow of network traffic between malicious indicators and hosts identifiers. In one embodiment, the processor maps the flow of network traffic between the malicious indicators and the host identifiers by generating a directed graph. The directed graph generated by the processor includes a host node for each host identifier an indicator node for each malicious indicator. The directed graph further includes directed edges connecting the nodes. Each directed each connects two nodes in the directed graph and indicates a direction of that maps a direction of flow of network traffic between the two nodes (e.g., a direction of flow from an indicator node to a host node or vice versa).

The processor determines 904 an exposed set of host identifiers based on the mapped flow of network traffic mapped at step 903. The processor determines the exposed set of host identifiers by determining host nodes having inbound traffic from at least one indicator node. The exposed set of host identifiers identifies hosts that form an attack surface of the client domain 110.

The processor determines 905 host attributes and indicator attributes associated with each host identifier. In one embodiment, the processor determines the host attributes and indicator attributes by retrieving the host attributes and indicator attributes from a database, such as database 250, threat data store 212, other database associating host attributes and/or indicator attributes to host identifiers or malicious indicators connected thereto, or some combination thereof. In one embodiment, the processor may infer or predict the host attributes and/or indicator attributes, e.g., using heuristics or through machine learning.

The processor provides 906 the exposed set of host identifiers and the associated host attributes and indicator attributes as input to a prioritization model 222A. In embodiments, the processor generates feature vectors for each host identifier in the exposed set of host identifiers based on the associated host attributes and indicator attributes associated with each host identifier in the exposed set of host identifiers. In one embodiment, the prioritization model 222A may comprise a regression model, and the prioritization model 222A applies regression coefficients that are learned through training (as explained with respect to the description of FIG. 5), to each feature vector for each host identifier in the exposed set to generate a prioritization score for the host identifier.

The processor receives 907 prioritization scores associated with each host identifier as output from the prioritization model. When the processor provides the host identifiers and associated features to the trained prioritization model 222A, the prioritization model 222A provides predicted prioritization scores as output. The processor is configured to receive the output of the prioritization model 222A.

The processor generates 908 a prioritized attack surface data structure based on the prioritization scores. For example, the prioritized attack surface data structure may comprise a ranked list (e.g., highest prioritization score ranked first) including each host identifier in the exposed set and its associated prioritization score. In embodiments, an interface is provided by the processor and is configured to modify a display based on the prioritized attack surface data structure, such as the interface described with respect to the descriptions of FIGS. 6A, 6B, and 7.

The embodiments described herein provide several technical advantages. By correlating network traffic logs for a domain with threat data feeds or other threat intelligence, hosts of a domain may be discovered without a predefined inventory list identifying the domain's assets. By mapping a flow of network traffic between the identified assets and identified threats, an exposed set of host identifiers identifying the hosts that make up the domain's attack surface (e.g., internet-facing assets) can be generated. Furthermore, by training a prioritization model to predict prioritization scores for host identifiers based on their associated host attributes and indicator attributes, the exposed set of host identifiers may be scored and used to generate a prioritized attack surface data structure that enables a configurable interface for searching through vulnerable hosts of a domain and for initiating resolutions to identified vulnerabilities in an efficient manner. Therefore, even for a large organization with several potential points of vulnerabilities, the most critical vulnerabilities may be addressed in a timely manner.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for threat detection through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   obtaining a plurality of network traffic logs for a domain;
   correlating the plurality of network traffic logs with a plurality of threat data feeds to identify a plurality of malicious indicators and a plurality of host identifiers communicating with the plurality of malicious indicators, the plurality of host identifiers identifying a plurality of hosts of the domain;
   mapping a flow of network traffic between the plurality of malicious indicators and the plurality of host identifiers from the plurality of network traffic logs;
   determining an exposed set of host identifiers from among the plurality of host identifiers having inbound traffic from at least one malicious indicator from the plurality of malicious indicators based on the mapping, the exposed set of host identifiers identifying hosts that form an attack surface of the domain;
   determining host attributes and indicator attributes associated with each host identifier in the exposed set of host identifiers;
   providing the exposed set of host identifiers and the associated host attributes and indicator attributes as input to a prioritization model;
   receiving one or more prioritization scores associated with each host identifier in the exposed set of host identifiers as output from the prioritization model; and
   generating a prioritized attack surface data structure based on the one or more prioritization scores associated with each host identifier, wherein an interface is configured to modify a display based at least in part on the prioritized attack surface data structure.

2. The method of claim 1, wherein mapping the flow of network traffic between the plurality of malicious indicators and the plurality of host identifiers from the plurality of network traffic logs comprises:
   generating a directed graph comprising a plurality of nodes connected by a plurality of directed edges, wherein generating the directed graph comprises:
      generating host nodes in the directed graph for each host identifier in the plurality of host identifiers from the plurality of network traffic logs;
      generating indicator nodes for each malicious indicator in the plurality of malicious indicators from the plurality of network traffic logs; and
      generating directed edges between the host nodes and the indicator nodes, each directed edge mapping a direction of flow of network traffic between a host identifier corresponding to the host node and a malicious indicator corresponding to the indicator node.

3. The method of claim 2, wherein determining the exposed set of host identifiers having inbound traffic from the at least one malicious indicator based on the mapping comprises:
   determining one or more directed edges having a direction moving from an indicator node to a host node; and
   identifying the host identifiers corresponding to the host nodes connected in the one or more directed edges as host identifiers of the exposed set of host identifiers.

4. The method of claim 1, wherein the prioritization model is configured to:
   receive a plurality of host identifiers, host attributes associated with each of the received host identifiers, and indicator attributes associated with each of the received host identifiers as input;
   generate feature vectors associated with the received host identifiers in the plurality of host identifiers based on the host attributes and the indicator attributes associated with each of the received host identifiers;
   generate prioritization scores for each of the received host identifiers based on a weighting of the feature vectors associated with the received host identifiers; and
   output the prioritization scores for each of the received host identifiers.

5. The method of claim 4, wherein the prioritization model is generated by:
   obtaining a training dataset comprising a plurality of host identifiers, a plurality of host attributes associated with each host identifier in the plurality of host identifiers, a plurality of indicator attributes associated with each host identifier in the plurality of host identifiers, and target prioritization scores associated with each of the host identifiers;
   generating feature vectors for each host identifiers in the plurality of host identifiers in the training dataset based on the host attributes and indicator attributes;
   applying the feature vectors to a regression model to predict prioritization scores for each of the host identifiers, the regression model associating regression coefficients to the feature vectors;
   comparing the predicted prioritization scores to the target prioritization scores; and
   updating the regression coefficients associated with the feature vectors based on the comparison, the updated regression coefficients forming the weighting of the feature vectors in the prioritization model.

6. The method of claim 4, wherein generating feature vectors for each host identifier in the exposed set of host identifiers comprises generating one or more of: an exposed services feature vector, a network connectivity feature vector, an asset criticality feature vector, an endpoint vulnerability feature vector, or a connecting indicator feature vector.

7. The method of claim 6, wherein generating the exposed services feature vector for a host identifier comprises:
   identifying one or more ports associated with each host identifier;

determining one or more services running on the one or more ports; and
generating values in the exposed services feature vector based on the determined one or more services.

8. The method of claim 6, wherein generating the network connectivity feature vector for a host identifier comprises:
evaluating network connections associated with the host identifier; and
generating values in the network connectivity feature vector based on the evaluation of the network connections associated with the host identifier.

9. The method of claim 6, wherein generating the asset criticality feature vector for a host identifier comprises:
obtaining a list of critical host identifiers;
comparing the host identifier to the list of critical host identifiers; and
generating values in the asset criticality feature vector based on the comparison.

10. The method of claim 6, wherein generating the endpoint vulnerability feature vector for a host identifier comprises:
identifying one or more vulnerabilities associated with the host identifier;
determining if the one or more vulnerabilities are a critical vulnerability; and
generating values in the endpoint vulnerability feature vector based on the determination.

11. The method of claim 6, wherein generating the connecting indicator feature vector for a host identifier comprises:
determining a number of malicious indicators connected to the host identifier;
determining confidence scores for each of the malicious indicators connected to the host identifier;
determining types for each of the malicious indicators; and
generating values in the connecting indicator feature vector based on the determined number of malicious indicators, the determined confidence scores, and the determined types.

12. A non-transitory computer-readable storage medium storing instructions that when executed by one or more processors cause the one or more processors to perform operations, the instructions comprising instructions to:
obtain a plurality of network traffic logs for a domain;
correlate the plurality of network traffic logs with a plurality of threat data feeds to identify a plurality of malicious indicators and a plurality of host identifiers communicating with the plurality of malicious indicators, the plurality of host identifiers identifying a plurality of hosts of the domain;
map a flow of network traffic between the plurality of malicious indicators and the plurality of host identifiers from the plurality of network traffic logs;
determine an exposed set of host identifiers from among the plurality of host identifiers having inbound traffic from at least one malicious indicator from the plurality of malicious indicators based on the mapping, the exposed set of host identifiers identifying hosts that form an attack surface of the domain;
determine host attributes and indicator attributes associated with each host identifier in the exposed set of host identifiers;
provide the exposed set of host identifiers and the associated host attributes and indicator attributes as input to a prioritization model;
receive one or more prioritization scores associated with each host identifier in the exposed set of host identifiers as output from the prioritization model; and
generate a prioritized attack surface data structure based on the one or more prioritization scores associated with each host identifier, wherein an interface is configured to modify a display based at least in part on the prioritized attack surface data structure.

13. The non-transitory computer-readable medium of claim 12, wherein the instructions to map the flow of network traffic between the plurality of malicious indicators and the plurality of host identifiers from the plurality of network traffic logs comprise instructions to:
generate a directed graph comprising a plurality of nodes connected by a plurality of directed edges, wherein generating the directed graph comprises:
generate host nodes in the directed graph for each host identifier in the plurality of host identifiers from the plurality of network traffic logs;
generate indicator nodes for each malicious indicator in the plurality of malicious indicators from the plurality of network traffic logs; and
generate directed edges between the host nodes and the indicator nodes, each directed edge mapping a direction of flow of network traffic between a host identifier corresponding to the host node and a malicious indicator corresponding to the indicator node.

14. The non-transitory computer-readable medium of claim 13, wherein the instructions to determine the exposed set of host identifiers having inbound traffic from the at least one malicious indicator based on the mapping comprise instructions to:
determine one or more directed edges having a direction moving from an indicator node to a host node; and
identify the host identifiers corresponding to the host nodes connected in the one or more directed edges as host identifiers of the exposed set of host identifiers.

15. The non-transitory computer-readable medium of claim 12, wherein the prioritization model is configured to:
receive a plurality of host identifiers, host attributes associated with each of the received host identifiers, and indicator attributes associated with each of the received host identifiers as input;
generate feature vectors associated with the received host identifiers in the plurality of host identifiers based on the host attributes and the indicator attributes associated with each of the received host identifiers;
generate prioritization scores for each of the received host identifiers based on a weighting of the feature vectors associated with the received host identifiers; and
output the prioritization scores for each of the received host identifiers.

16. The non-transitory computer-readable medium of claim 15, wherein the prioritization model is generated by:
obtaining a training dataset comprising a plurality of host identifiers, a plurality of host attributes associated with each host identifier in the plurality of host identifiers, a plurality of indicator attributes associated with each host identifier in the plurality of host identifiers, and target prioritization scores associated with each of the host identifiers;
generating feature vectors for each host identifiers in the plurality of host identifiers in the training dataset based on the host attributes and indicator attributes;
applying the feature vectors to a regression model to predict prioritization scores for each of the host identifiers, the regression model associating regression coefficients to the feature vectors;

comparing the predicted prioritization scores to the target prioritization scores; and updating the regression coefficients associated with the feature vectors based on the comparison, the updated regression coefficients forming a weighting of the feature vectors in the prioritization model.

17. The non-transitory computer-readable medium of claim 15, wherein generating feature vectors for each host identifier in the exposed set of host identifiers comprises generating one or more of: an exposed services feature vector, a network connectivity feature vector, an asset criticality feature vector, an endpoint vulnerability feature vector, or a connecting indicator feature vector.

18. A system comprising:
one or more processors; and
a non-transitory computer-readable medium storing instructions that when executed by the one or more processors cause the one or more processors to perform operations comprising:
obtaining a plurality of network traffic logs for a domain;
correlating the plurality of network traffic logs with a plurality of threat data feeds to identify a plurality of malicious indicators and a plurality of host identifiers communicating with the plurality of malicious indicators, the plurality of host identifiers identifying a plurality of hosts of the domain;
mapping a flow of network traffic between the plurality of malicious indicators and the plurality of host identifiers from the plurality of network traffic logs to determine an exposed set of host identifiers from among the plurality of host identifiers that form an attack surface of the domain;
determining host attributes and indicator attributes associated with each host identifier in the exposed set of host identifiers;
providing the exposed set of host identifiers and the associated host attributes and indicator attributes as input to a prioritization model to receive one or more prioritization scores associated with each host identifier in the exposed set of host identifiers as output from the prioritization model; and
generating a prioritized attack surface data structure based on the one or more prioritization scores associated with each host identifier, wherein an interface is configured to modify a display based at least in part on the prioritized attack surface data structure.

19. The system of claim 18, wherein the operations further comprise:
generating a directed graph comprising a plurality of nodes connected by a plurality of directed edges, wherein the plurality of nodes comprise:
host nodes for each host identifier in the plurality of host identifiers from the plurality of network traffic logs;
indicator nodes for each malicious indicator in the plurality of malicious indicators from the plurality of network traffic logs; and wherein:
one or more directed edges map a direction of flow of network traffic between a host identifier corresponding to the host node and a malicious indicator corresponding to the indicator node.

20. The system of claim 18, wherein the prioritization model is a machine learning model, and wherein features of the machine learning model include one or more of: exposed services features, network connectivity features, asset criticality features, endpoint vulnerability features, or connecting indicator features.

* * * * *